Jan. 19, 1971     R. F. LEVEY ET AL     3,556,916
ARTIFICIAL FLOWER INCLUDING A PIERCEABLE CASING
CONTAINING A SCENT-PRODUCING SUBSTANCE
Filed June 4, 1968

INVENTORS.
ROBERT F. LEVEY
SANDRA R. LEVEY
BY
ATTORNEYS.

United States Patent Office  3,556,916
Patented Jan. 19, 1971

3,556,916
ARTIFICIAL FLOWER INCLUDING A PIERCEABLE CASING CONTAINING A SCENT-PRODUCING SUBSTANCE
Robert F. Levey and Sandra R. Levey, both of 4524 Beeman, Studio City, Calif. 91604
Filed June 4, 1968, Ser. No. 734,435
Int. Cl. A41g 1/00
U.S. Cl. 161—28                                  4 Claims

ABSTRACT OF THE DISCLOSURE

An artificial flower includes a plastic petal structure having a cup-shaped receptacle and a depending portion, a plastic element having an epicalyx portion and a leaf portion received on the depending portion, a stem received within a bore provided in the depending portion, and a casing containing a scent-producing substance received within the receptacle.

This invention relates to an artificial flower.

There are presently available on the market artificial flowers that are constructed of plastic. A large number of these artificial flowers are manufactured outside of this country, because of the relatively inexpensive labor costs for manufacturing and assembling such items.

The present invention provides an improved artificial flower that may be domestically manufactured to compete favorably with the foreign made artificial flowers since the artificial flower of the present invention is constructed of a minimum number of plastic parts that may be readily assembled in an inexpensive fashion to allow it to be competitive with the foreign manufactured flowers. In addition, the present invention provides an improved artificial flower including scent means associated with the flower. This allows the flower to be utilized as a room deodorizer as well as a decorative piece. The particular scenting means of the flower is encased to preserve it until it is desired to be used.

Structurally the artificial flower of the present invention is constructed of a plastic wherein the various elementary portions of the flower may be molded or stamped out and assembled by unskilled labor. The petal defining structure of the flower is provided with a convenient means for mounting the scenting means for the flower. If the artificial flower is constructed in the fashion of a daisy, for example, the central portion of the daisy petal structure includes a mounting socket for receiving a spherical casing means storing the scent-emitting material that is adapted to emit a scent therefrom only when exposed to the atmosphere. When the casing is broken the scent-emitting material, which may be a gelatin substance and preferably of a color compatible with the coloring of the natural flower, allows the scent to be emitted until the scent-emitting material is used up.

These and other features of the present invention may be more fully appreciated when considered in the light of the following specification and drawings, in which.

Figure 1:
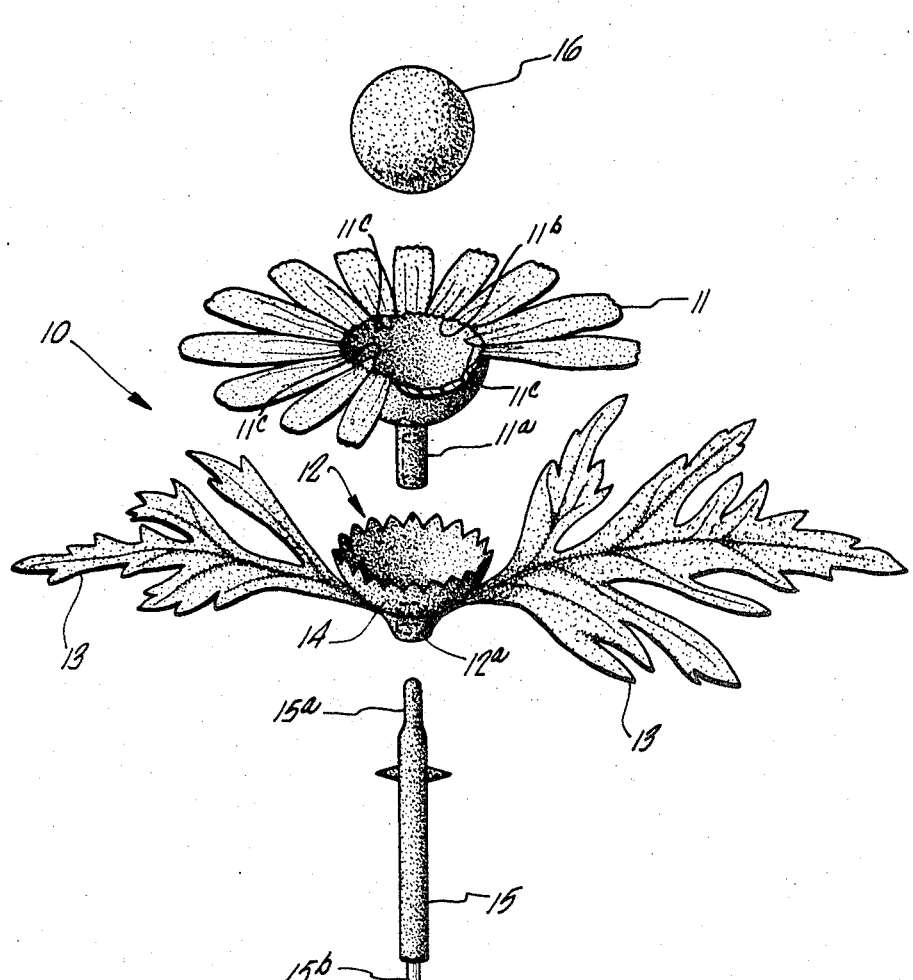
FIG. 1 is an exploded view of the artificial flower embodying the present invention.

Now referring to the drawings in particular, the detailed construction of the improved artificial flower will be described. It should be recognized at the outset that the invention may be embodied in terms of any natural flower. For the purposes of facilitating the description of the invention it will be described as it is embodied for constructing an artificial daisy.

The artificial daisy 10 is preferably constructed of three basic elements. The means for defining the petal structure of the daisy is identified by the reference character 11. The means defining the leaf structure comprises a plastic element 12 and includes a portion 14 defining the epicalyx and a leaf portion 13. The epicalyx is of a cup-shaped structure and is integrally mounted centrally of the leaf structure 13, illustrated as a leaf structure extending from the two sides of the epicalyx 14. The remaining element of the daisy is the means defining the flower stem which is identified by the reference character 15. The petal structure 11 includes a central depending portion 11$^a$ depending from the bottom portion thereof. The dependent portion 11$^a$ is of a hollow construction to accept the end 15$^a$ of the stem structure 15. Before assembled in this fashion the element 12 which includes a hollow socket 12$^a$ for the leaf structure 13 and the epicalyx 14 is slipped over the end of the depending portion 11$^a$ to place it in engagement with a bottom portion of the petal structure 11 as in the natural flower arrangement. Accordingly with the positioning of the stem structure into the depending portion 11$^a$ the artificial flower assembly is complete. The stem structure 15 may comprise a plastic coated flexible wire. The wire is represented by the reference character 15$^b$ extending from the free end of the stem 15. It should be apparent then that with the construction of the artificial flower as described hereinabove that the elements 11, 12 and 15 may be readily manufactured and simply assembled with a minimum of skill.

Figure 2:
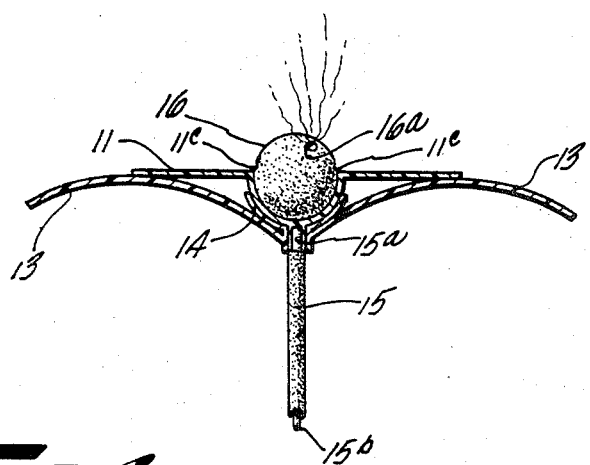
FIG. 2 is a cross-sectional view of the artificial flower of FIG. 1 showing the ruptured casing means diagrammatically emitting a scent.

The petal structure 11 of the present invention is modified from the construction of the conventional artificial flower through the provision of a mounting socket 11$^b$ provided substantially centrally of the petal structure 11 and is constructed and defined for receiving the means 16 encasing the scent producing material. The casing means 16 may be a plastic ball having a thin wall that provides storage of the scent producing means and yet may be readily ruptured to expose the scent producing means to the atmosphere. The scent producing means may be a commercially available gelatin such that when it is completely encased the scent is not emitted from the flower. When the casing 16 is ruptured such as illustrated at 16$^a$ in FIG. 2, the gelatin will be exposed to the atmosphere and allow the scent to escape. The casing 16 is secured to the petal structure 11 by cementing it thereto or in any other convenient structure 11 by cementing it thereto or in any other convenient fashion. Again, it will be noted that the scenting means of the artificial flower can be readily manufactured through the mounting of the casing 16 to the petal structure 11.

Another means of securing the casing 16 to the mounting socket 11$^b$ is through the provision of the prongs 11$^c$ around the periphery thereof. Three such prongs are illustrated. The prongs 11$^c$ extend inwardly of the outer periphery of the socket 11$^b$ and are constructed of the same plastic as the socket proper. The engagement of the casing means 16 and socket 11$^b$ is secured by means of these prongs 11$^c$.

The artificial flower 10 can also be defined to glow in the dark. For this purpose, one of the flower elements can be provided with a phosphorescent material. Preferably the casing means 16 and/or the petal structure can be provided with such a material.

The present invention has advanced the state of the art of artificial flowers through the provision of an artificial flower that may be readily constructed of three basic parts and simply and inexpensively assembled. In addition, the artificial flower of the present invention incorporates means for providing a scent for an artificial flower allowing it to be used as a room deodorizer as well as a decorative item.

What is claimed is:

1. An artificial flower comprising:

a plastic petal structure including a cup-shaped receptacle and a depending portion extending from the bottom surface of said receptacle and having an outer surface and a central bore extending from the free end thereof;

a plastic element having a plastic leaf portion and a plastic epicalyx portion, said element having a central hole received on said outer surface of said depending portion, said epicalyx portion being cup-shaped and engaging said bottom surface of said receptacle surrounding said depending portion, said leaf portion extending outwardly from said epicalyx portion;

a stem having an end portion received within said central bore of said depending portion; and a casing containing a scent-producing substance and being of a shape conforming with said receptacle received within said receptacle, said receptacle being provided with means to retain said casing within said receptacle and wherein said casing is capable of being pierced to allow the scent to escape therefrom.

2. An artificial flower as recited in claim 1, wherein said means to retain said casing within said receptacle comprises a retaining structure extending inwardly from the periphery of said receptacle.

3. An artificial flower as recited in claim 1, wherein said stem comprises a plastic covered flexible element.

4. An artifiical flower as recited in claim 1, wherein at least one of said casing and petal structure includes a phosphorescent material.

References Cited

UNITED STATES PATENTS

| | | | |
|---|---|---|---|
| 1,720,881 | 7/1929 | Brewster | 161—30X |
| 3,137,610 | 6/1964 | Flynn | 161—30 |
| 1,694,844 | 12/1928 | De Gerson | 161—30 |
| 2,204,037 | 6/1940 | Fernbach | 161—30X |
| 3,039,220 | 6/1962 | Fristot | 161—30 |

HAROLD ANSHER, Primary Examiner

H. F. EPSTEIN, Assistant Examiner

U.S. Cl. X.R.

156—67; 161—30, 191, 410